(12) United States Patent
Wu et al.

(10) Patent No.: US 12,580,360 B2
(45) Date of Patent: Mar. 17, 2026

(54) FOLDED HYBRID ASSEMBLY FOR DOPED FIBER AMPLIFIER

(71) Applicant: II-VI Delaware, Inc., Wilmington, DE (US)

(72) Inventors: Yuping Wu, Fuzhou (CN); Chunyan Jia, Fuzhou (CN); Han Chen, Fuzhou (CN); Xu Su, Fuzhou (CN); Xuchen Huang, Fuzhou (CN)

(73) Assignee: II-VI DELAWARE, INC., Wilmington, DE (US)

( * ) Notice: Subject to any disclaimer, the term of this patent is extended or adjusted under 35 U.S.C. 154(b) by 699 days.

(21) Appl. No.: 18/149,512

(22) Filed: Jan. 3, 2023

(65) Prior Publication Data

US 2024/0055820 A1 Feb. 15, 2024

(30) Foreign Application Priority Data

Aug. 15, 2022 (CN) .......................... 202210973621.2

(51) Int. Cl.
*H01S 3/067* (2006.01)
*H01S 3/16* (2006.01)
*H01S 3/094* (2006.01)

(52) U.S. Cl.
CPC ........ *H01S 3/06766* (2013.01); *H01S 3/1608* (2013.01); *H01S 3/094003* (2013.01)

(58) Field of Classification Search
CPC ............... H01S 3/06766; H01S 3/1608; H01S 3/094003

(Continued)

(56) References Cited

U.S. PATENT DOCUMENTS

| | | | | |
|---|---|---|---|---|
| 7,362,499 B2 * | 4/2008 | Hayashi | ................. | H01S 3/302 |
| | | | | 359/334 |
| 8,098,425 B2 * | 1/2012 | Zhang | ..................... | G02B 6/12 |
| | | | | 359/341.32 |

(Continued)

*Primary Examiner* — Daniel A Hess
(74) *Attorney, Agent, or Firm* — Blank Rome LLP

(57) ABSTRACT

An assembly is used with an amplifier that amplifies light using source light, pump light, and a doped fiber. The assembly has a plurality of ports, including a first port for input of the source light, a second port for input of the pump light, a third port for output to the doped fiber, a fourth port for input from the doped fiber, and a fifth port for amplified output. A birefringent device in optical communication with each of the ports is configured to refract o-light and e-light components of the light passing therethrough with different refractive indices. For the first and fourth ports, a first half-wave plate in optical communication through the birefringent device is configured to rotate polarization of the light passing therethrough with a first rotation. For the second port, a second half-wave plate in optical communication through the birefringent device is configured to rotate polarization of the light passing therethrough with a second rotation different from the first polarization. A lens is used to focus the light, and an optical filter in optical communication with the lens is configured to reflect the pump light back to the lens and being configured to pass the source light. A rotator in optical communication with the lens is configured to rotate polarization of the light passing therethrough with a third rotation. The third rotation is half of the first rotation, and the first rotation is half of the second rotation. Finally, a wedge reflector in optical communication with the rotator is configured to reflect the light incident thereto. The source light and the pump light are combined and communicated from the second port for output to the doped fiber. Meanwhile, amplified light from the doped fiber is received at the fourth port and is communicated to the amplified output. Reverse light from the amplified output can be isolated from (Continued)

reaching the doped fiber, and reverse source light from the doped fiber can be isolated from reaching the source port.

22 Claims, 8 Drawing Sheets

(58) Field of Classification Search
USPC ........................................................ 359/334
See application file for complete search history.

(56) References Cited

U.S. PATENT DOCUMENTS

| | | | | |
|---|---|---|---|---|
| 9,042,007 B1 * | 5/2015 | Qiao | ................... | H01S 3/13013 |
| | | | | 359/341.32 |
| 12,300,960 B2 * | 5/2025 | McClean | .......... | H01S 3/094003 |
| 2017/0085052 A1 * | 3/2017 | Zhao | ................ | H01S 3/094003 |
| 2022/0239052 A1 * | 7/2022 | McClean | ............ | H01S 3/09415 |

* cited by examiner

FOLDED HYBRID ASSEMBLY FOR DOPED FIBER AMPLIFIER

CROSS-REFERENCE TO RELATED APPLICATIONS

The present application claims priority to Chinese Patent Application No. 202210973621.2 filed Aug. 15, 2022. The aforementioned application is hereby incorporated by reference in its entirety.

BACKGROUND OF THE DISCLOSURE

FIG. 1 illustrates a fiber amplifier module 10 according to the prior art for use in optical fiber communication. The fiber amplifier module 10 can be an Erbium-doped fiber amplifier (EDFA) having a doped fiber coil 24, as is widely used in optical fiber communications. The module 10 also has three passive components, which include a first isolator 20, a beam combiner 22, and a second isolator 26.

In the fiber amplifier module 10, a source signal from a first input 11 is transmitted through a doped fiber coil 24. At the same time, pump light having a different wavelength is provided by a pump laser at a second input 12 and is combined with the source light at the combiner 22, which combines the source light with the pump light. The first isolator 20 prevents back reflection from the combiner 22.

A third port 13 of the doped fiber coil 24 receives the source and pump light. In the coil 24, ions in the doped fiber are energized using the source light. Photons of the pump light interact with the energized ions, causing the ions to give up some of their energy in the form of photons at the same wavelength as the source light, with the ions returning to a lower energy state. The source light is thereby amplified as it passes through the doped fiber coil 24 and is output by a fourth port 14. The second isolator 26 then prevents back reflection of an amplified signal output from the module's fifth port 15.

The package size for the fiber amplifier module 10 continues to get smaller with the rapid developments in optical fiber communications. Therefore, the space available for the passive components 20, 22, and 26 can be limited, and the traditional assembly using the three discrete components 20, 22, and 26 fails to meet the requirements of miniaturized modules.

What is needed is a configuration of components that can achieve a smaller package size of a fiber amplifier module. The subject matter of the present disclosure is directed to overcoming, or at least reducing the effects of, one or more of the problems set forth above.

SUMMARY OF THE DISCLOSURE

An assembly is disclosed herein for use with an amplifier that amplifies light using source light, pump light, and a doped fiber. The assembly comprises: a plurality of ports, a birefringent device, a first half-wave plate, a second half-wave plate, a lens, an optical filter, a rotator, and a wedge reflector. The ports include a first port for input of the source light, a second port for input of the pump light, a third port for output to the doped fiber, a fourth port for input from the doped fiber, and a fifth port for amplified output. The birefringent device is in optical communication with each of the ports and is configured to refract o-light and e-light components of the light passing therethrough with different refractive indices.

The first half-wave plate is in optical communication through the birefringent device with the first and fourth ports and is configured to rotate polarization of the light passing therethrough with a first rotation. The second half-wave plate is in optical communication through the birefringent device with the second port and is configured to rotate polarization of the light passing therethrough with a second rotation different from the first polarization. The lens is in optical communication with each of: the third and fifth ports through the birefringent device, the first and fourth ports through the first half-wave plate, and the second port through the second half-wave plate.

The optical filter is in optical communication with the lens. The optical filter is configured to reflect the pump light back to the lens and is configured to pass the source light. The rotator is in optical communication with the lens and is configured to rotate polarization of the light passing therethrough with a third rotation. The third rotation is half of the first rotation, the first rotation being half of the second rotation. The wedge reflector is in optical communication with the rotator and is configured to reflect the light incident thereto.

As disclosed herein, an amplifier can include an assembly as disclosed above and can include a doped fiber for amplifying source light using pump light.

A method is disclosed herein to amplify source light using pump light and a doped fiber for an amplified output. The method comprises: (i) receiving the source light at a source input and communicating the source light to a fiber input of the doped fiber; and (ii) receiving the pump light at a pump input and combining the pump light with the source light for the fiber input of the doped fiber.

To receive the source light at the source input and communicate the source light to the fiber input of the doped fiber, the method includes: splitting the source light into o-light and e-light components through a birefringent device; first rotating the split source light by a first rotation using a first half-wave plate; first focusing the first rotated source light with a lens; second rotating the first focused source light by a third rotation using a rotator; reflecting the second rotated source light using a wedge reflector; third rotating the reflected source light by the third rotation using the rotator; second focusing the third rotated source light with the lens; and combining the o-light and e-light components of the second focused source light through the birefringent device for the fiber input to the doped fiber; and To receive the pump light at the pump input and combine the pump light with the source light for the fiber input of the doped fiber, the method includes: splitting the pump light into o-light and e-light components through the birefringent device; first rotating the split pump light by a second rotation using a second half-wave plate; first focusing the first rotated pump light with the lens; reflecting the first focused pump light using an optical filter; second focusing the reflected pump light with the lens; and combining the o-light and e-light components of the second focused pump light through the birefringent device for the input to the doped fiber.

The foregoing summary is not intended to summarize each potential embodiment or every aspect of the present disclosure.

DETAILED DESCRIPTION OF THE DISCLOSURE

Figures 1, 2:
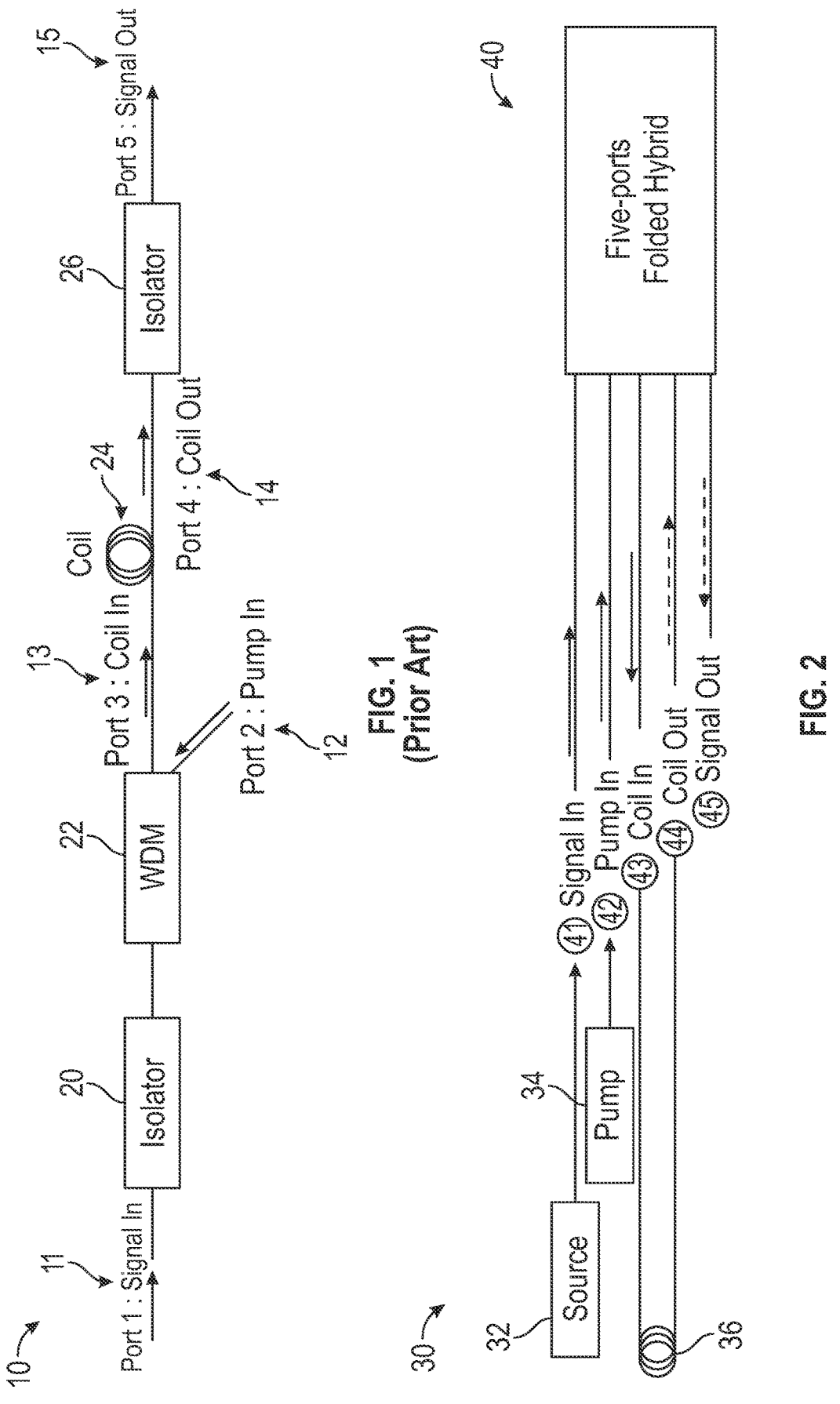
FIG. 1 illustrates a fiber amplifier module according to the prior art for use in optical fiber communication.
FIG. 2 diagrams the function of the disclosed folded hybrid assembly.

FIG. 2 diagrams a folded hybrid assembly 40 of the present disclosure for use in a fiber amplifier module 30. The folded hybrid assembly 40 has five ports 41 . . . 45 for the optical signals. Source light from a source 32 enters a first port 41 of the assembly 40, and pump light from a pump laser 34 enters a second port 42. The folded hybrid assembly 40 achieves both isolating and combining functions and outputs the combined source light at a third port 43 for passage to a doped fiber coil 36. In the doped fiber coil 36, ions in the doped fiber are energized using the source light. Photons of the pump light interact with the energized ions, causing the ions to give up some of their energy in the form of photons at the same wavelength as the source light, with the ions returning to a lower energy state. The source light is thereby amplified as it passes through the doped fiber coil 36. The amplified source light from the doped fiber coil 36 then enters a fourth port 44, and the folded hybrid assembly 40 achieves an isolating function before outputting the amplified signal from a fifth port 45.

In one example, the fiber amplifier can be an Erbium-doped fiber amplifier (EDFA) used to amplify signals at a low loss in a 1550-nm wavelength range of the fiber. In the EDFA, a short length (a few meters) of the optical fiber in the coil 36 is doped with the rare-earth element erbium. The pump laser 34 injects the pumped light into the erbium-doped fiber coil 36 at a given wavelength to excite the erbium ions in the fiber coil 36. Energy is transferred to the source signal passing through the fiber coil 36 when the excited ions return to an unexcited state. The wavelength to be amplified can be in the 1550-nm range, and the wavelength of the pump light can be 980 and/or 1480 nm. These and other configurations can be used.

Figure 3A:
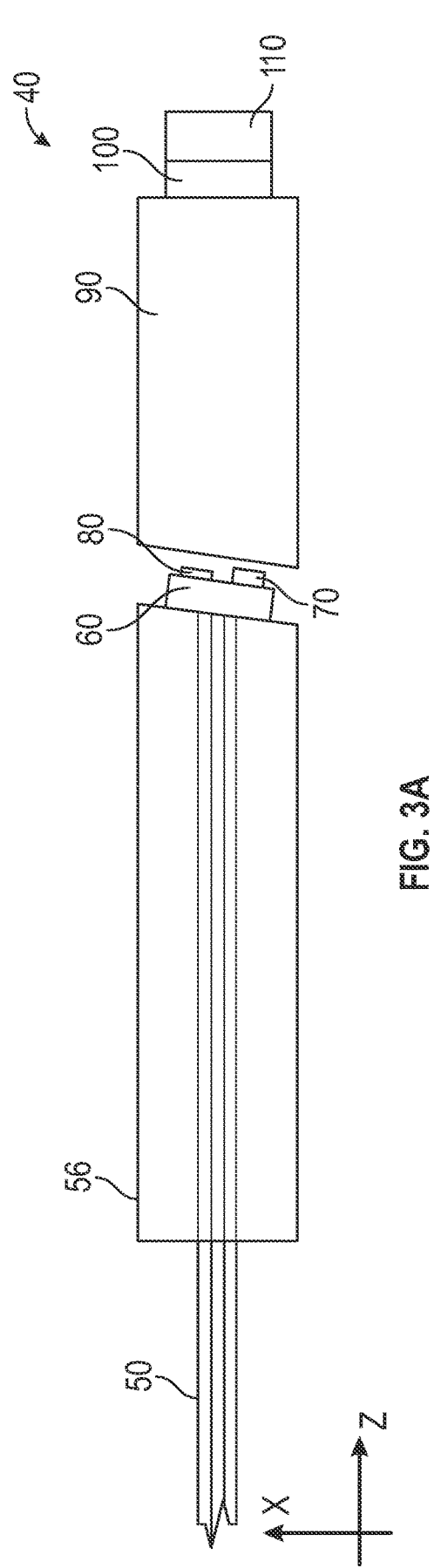
FIGS. 3A, 3B, and 3C illustrate side, top, and end views of a folded hybrid assembly according to the present disclosure.
Figure 3B:
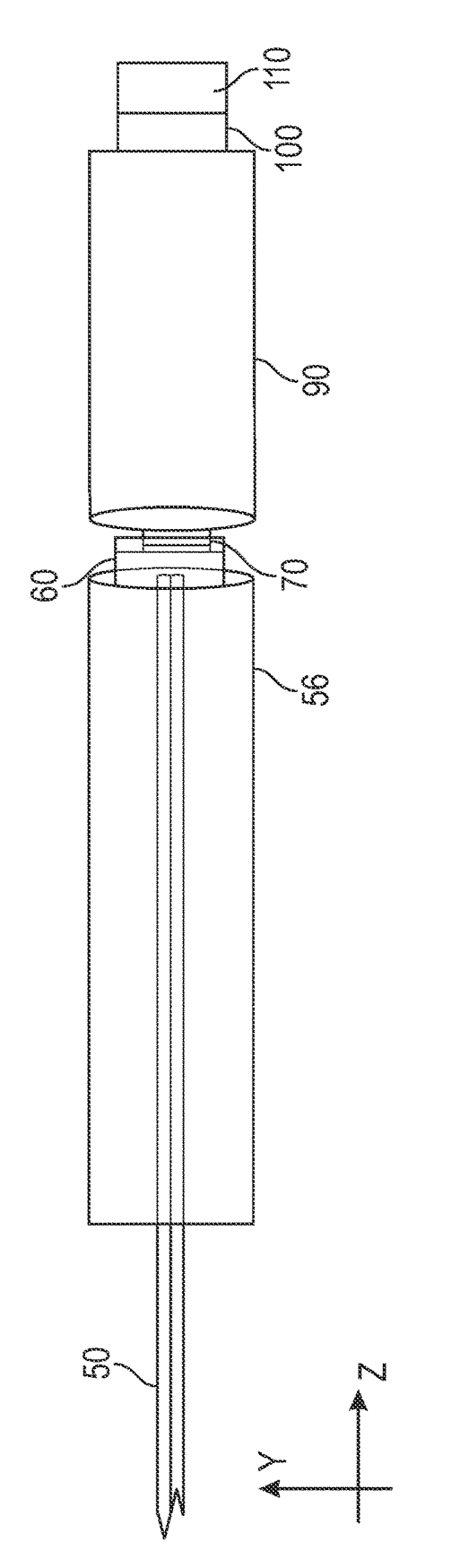
Figures 3C, 3D, 3E, 3F:
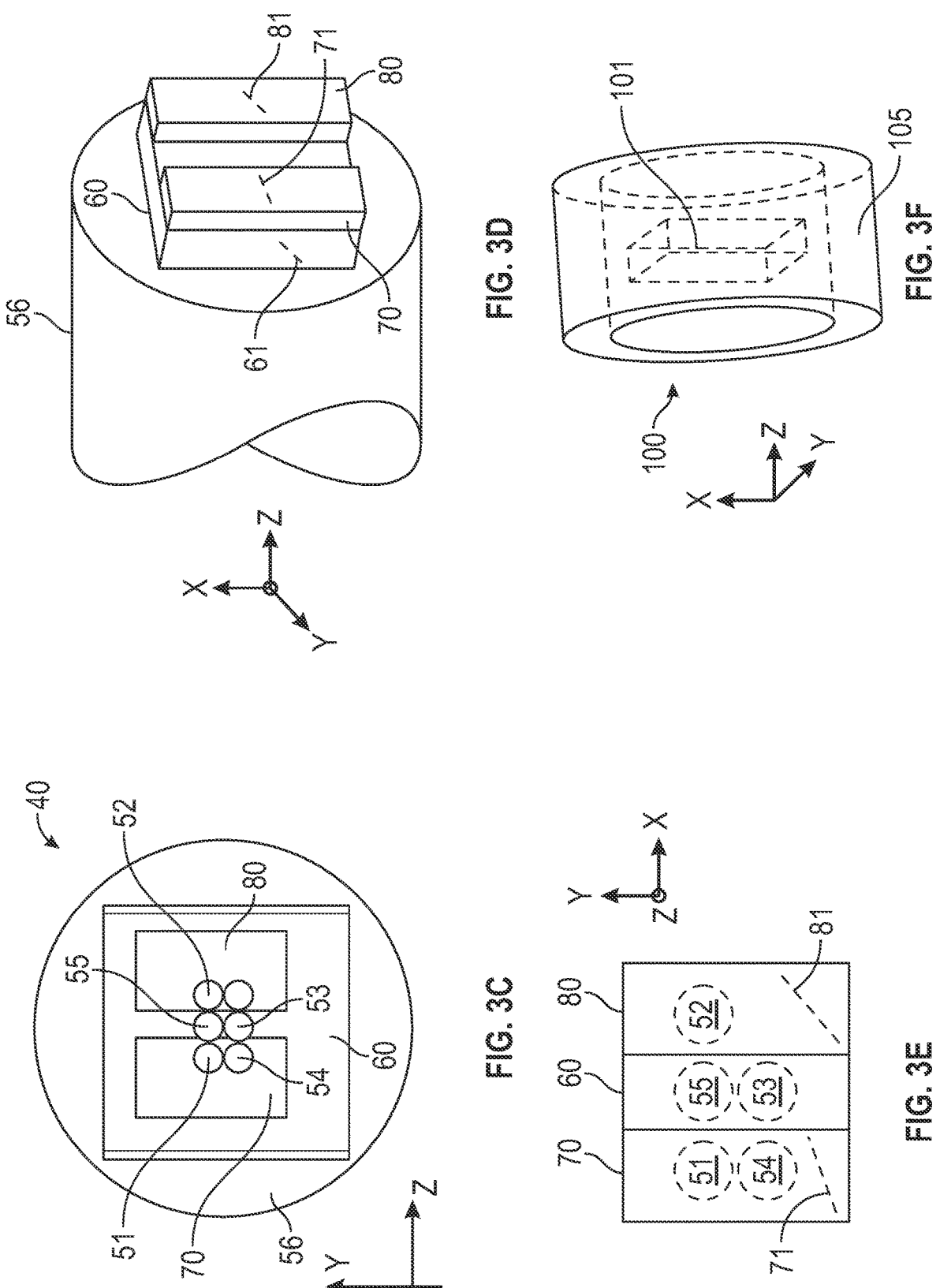
FIG. 3D illustrates a detailed perspective view of the birefringent device and waveplates for the disclosed hybrid assembly.
FIG. 3E illustrates a detailed end view of the birefringent device and waveplates for the disclosed hybrid assembly.
FIG. 3F illustrates an example Faraday rotator for the folded hybrid assembly.

FIGS. 3A, 3B, and 3C illustrate side, top, and end views of a folded hybrid assembly 40 according to the present disclosure for use in a fiber amplifier module. The folded hybrid assembly 40 can be used with source light from a source (32), pump light from a pump laser (34), and a doped-fiber coil (36), such as described in the fiber amplifier module of FIG. 3 to achieve a more compact size.

The folded hybrid assembly 40 includes a fiber array 50, a birefringent device 60, a first optical rotation device 70, a second optical rotation device 80, a lens 90, an intermediate rotation device 100, and a wedge reflector 110 arranged along an optical axis Z.

At an interface end of the assembly 40, the fiber array 50 can be disposed in a fiber pigtail or fiber head 56 having at least five slots, but typically six symmetrically-arranged slots are provided. Five different fibers 51 . . . 55 are provided in the five ports of the fiber head 50, as shown in FIG. 3C. Various arrangements can be used. For example, the optical fibers 51 . . . 55 can be combined in a porous optical fiber head 50 as shown or in an optical fiber array for positioning the optical fibers, or they may be positioned using any other suitable structures. The optical fiber head 50 may include, for example, a glass structure for positioning the optical fibers 51 . . . 55.

The birefringent device 60 can be a birefringent crystal of Yttrium Vanadate (YVO4) crystals, which is a displacement-type birefringent crystal and is used for splitting/combining the o-light (i.e., ordinary ray) and the e-light (i.e., extraordinary ray) inside the crystal. As expected, the o-light behaves according to Snell's law while the e-light does not.

FIG. 3D illustrates a detailed perspective view of the birefringent device 60 and optical rotation device 70, 80 for the disclosed hybrid assembly 40, and FIG. 3E illustrates a detailed end view of these elements.

In general, the optical axis (61) of the birefringent device 60 may intersect obliquely a surface of the device 60 at an angle of 45 degrees. The splitting direction of the o-light and the e-light components is perpendicular to the beam propagation direction (the Z direction) and is along the Y direction.

The first and second optical rotation devices 70, 80 are half-wavelength waveplates (i.e., half-wave plates) used for rotating a polarization direction of linear polarized light. For example, the optical rotation devices 70, 80 can be a type of ½ wavelength (λ) phase delay-type crystalline quartz waveplates used for rotating a polarization direction of linear polarized light. The first half-wave plate 70 can be a λ/2 waveplate defining an optical axis 71 of 67.5 degrees. The second half-wave plate 80 can be a λ/2 waveplate defining an optical axis 81 of 45 degrees.

The lens 90 can be a G-lens, i.e., a gradient index lens having a refractive index that varies radially so that the G-lens focuses light. The intermediate rotation device 100 can be a Faraday rotator. For example, FIG. 3F illustrates an example Faraday rotator 100 for use in the disclosed assembly 40. The Faraday rotator 100 includes a magneto-optical crystal 101 and a magnetic field device 105. The magnetic field device 105 may be, for example, a hollow magnetic ring used for providing a saturated magnetic field strength for the magneto-optical crystal 101, causing the magneto-optical crystal 101 to perform a rotation of the polarization direction of the linear polarized light in the X-Y plane with the rotation angle at 22.5 degrees. The magnetic field direction is parallel to the light propagation direction. That is, the magnetic field direction is in the Z direction.

In the assembly 40 of FIGS. 3A-3F, source light from a source (32) is input at the first fiber 51, and pump light from a pump laser (34) is input at the second fiber 52. The source light and the pump light are at different wavelengths, are combined, and are then output to the third fiber 53 for amplification in a doped fiber coil (36). The amplified signal from the doped fiber coil (36) enters the fourth fiber 54 to be routed to the fifth fiber 55 for eventual output from the assembly 40. Back-reflected light in a reverse light path, however, is isolated in the assembly. In this way, the five-port folded hybrid assembly 40 integrates the combined functions of two isolators and one beam combiner. Being combined, the assembly 40 can achieve both smaller size in length and diameter.

Figures 4A, 4B, 4C:
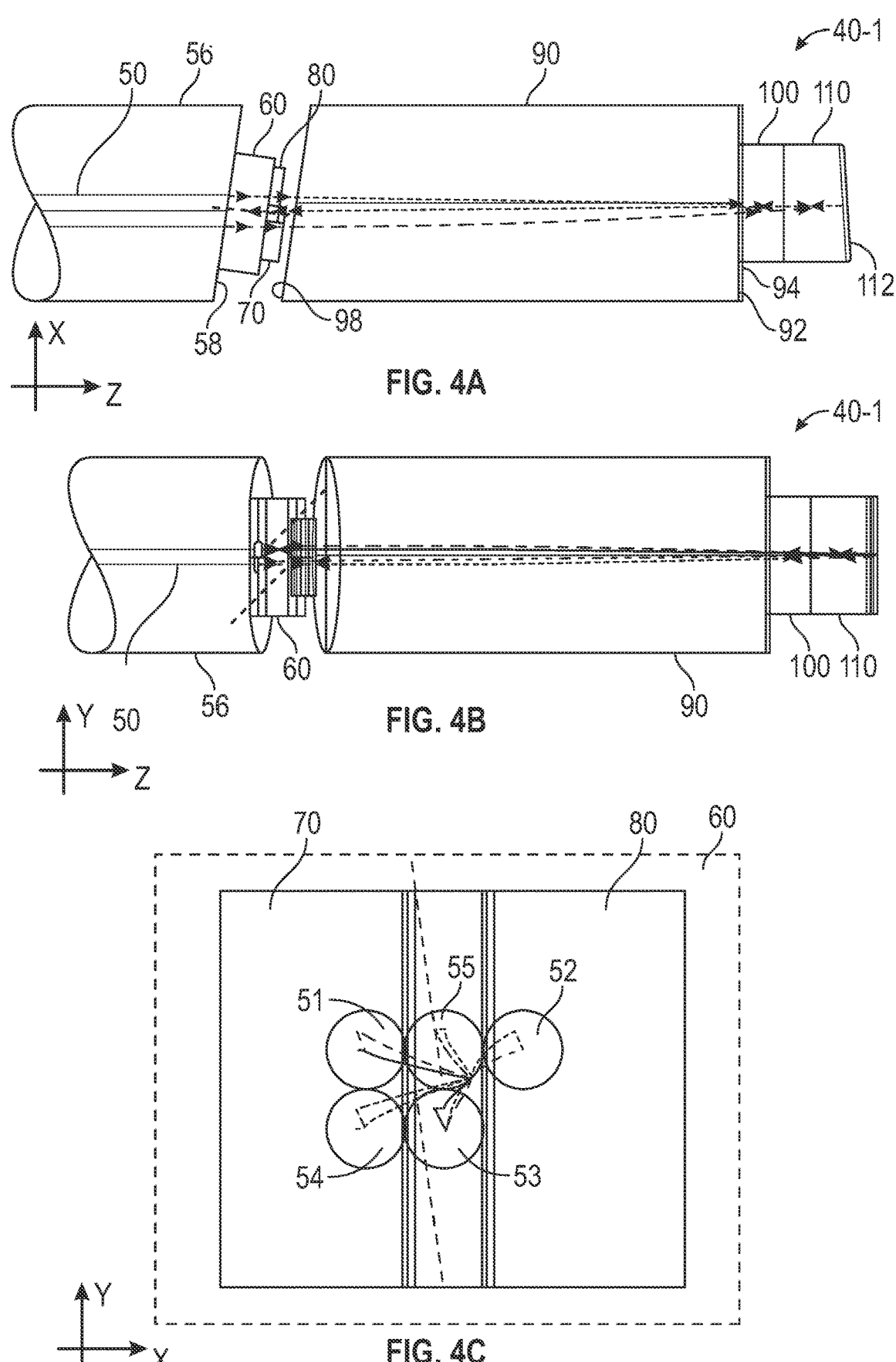
FIGS. 4A, 4B, and 4C illustrate side, top, and end views of a first embodiment of a folded hybrid assembly.

FIGS. 4A, 4B, and 4C illustrate side, top, and end views of a first embodiment of a folded hybrid assembly 40-1. This folded hybrid assembly 40-1 includes a 2-by-3 fiber array 50, a birefringent device 60, waveplates 70 and 80, a G-lens 90, a Faraday rotator 100, and a wedge reflector 110. The fibers 51 . . . 55 may be configured in a 2-by-3 array 50 and are arranged in a fiber pigtail or fiber head 56. The interface plane 58 of the fiber head 56 is cut at an 8-degree plane along the directions of the three adjacent fibers 51, 52, 53 of the array 50. The fibers 51 . . . 55 are arranged in five ports of the head 56 having specific positions, as shown in FIG. 4C.

The birefringent device 60 is affixed (e.g., glued) onto the head's 8-degree interface plane 58 and covers all of the ports having the fibers 51 . . . 55. The angle of the crystal's optical axis in the Y-Z plane is about 45 degrees for the device 60.

The first (67.5° λ/2) waveplate 70 is affixed (e.g., glued) on the birefringent device's surface and covers the ports having the first fiber 51 (for input of the source signal) and the fourth fiber 54 (for input of the amplified source signal). The second (45° λ/2) waveplate 80 is also affixed (e.g., glued) on the birefringent device's surface and covers the port having the second fiber 52, which receives the pump light from the pump laser (34). The ports for the third and fifth fibers 53, 55 are not covered by the waveplates 70, 80.

The G-lens 90 is a refractive index gradient lens. The backplane 98 of the G-lens 90 is cut at an 8-degree plane to match the fiber head's interface 58. This reduces reflection. The front plane 92 of the G-lens is flat (orthogonal). An optical filter 94, such as a coating film on the G-lens' front plane 92, is configured to reflect the wavelength of the pump light, but is configured to pass the wavelength of the source light.

The Faraday rotator 100 is affixed (e.g., glued) on the flat plane 92 of the G-lens 90 with an optical rotation angle of 22.5 degrees. The wedge reflector 110 is affixed (e.g., glued) on the Faraday rotator 100. The back wedge surface 112 is coated with a reflecting film configured to reflect light incident thereto, such as the source light wavelength.

Figure 5A:
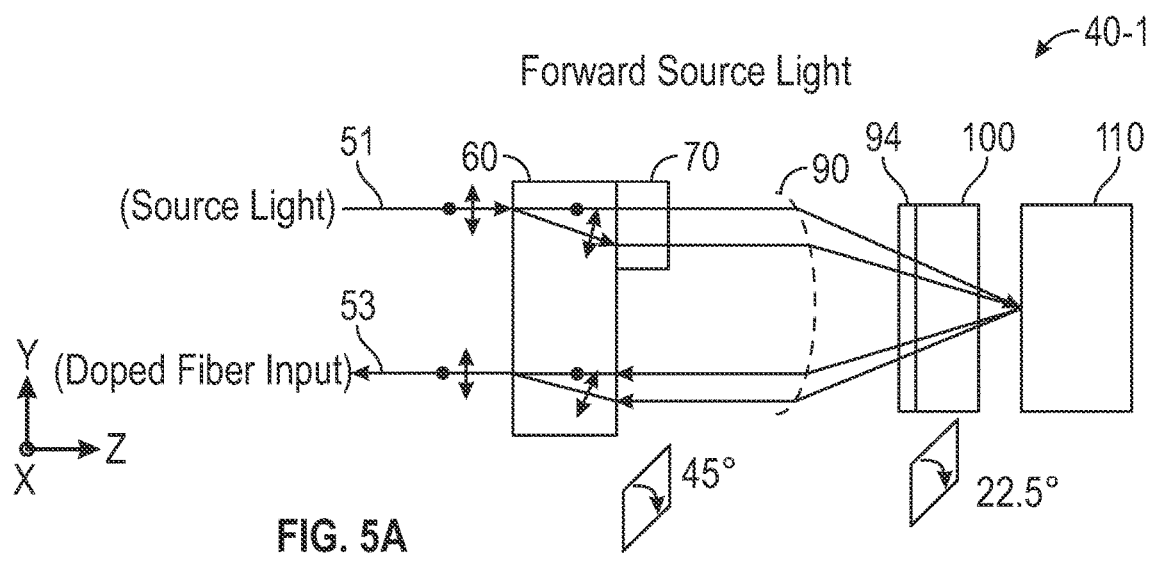
FIGS. 5A, 5B, and 5C diagram a forward light-path scheme for the first folded hybrid assembly.

The assembly 40-1 routes the signal and pump light in a forward light-path scheme to produce an amplified output. As shown in FIG. 5A, the source light is input at the first fiber 51, and the birefringent device 60 splits the source light into ordinary light (o-light component) and extraordinary light (e-light component). The first (67.5° λ/2) waveplate 70 then rotates the o-light and e-light components by 45 degrees. After passing through the G-lens 90, the Faraday rotator 100 rotates the o-light and e-light components 22.5 degrees, and the wedge reflector 110 reflects the light back. The o-light and e-light components are again rotated 22.5 degrees by the Faraday rotator 100. Rotated a total of 90 degrees at this point, the o-light has become e-light, and the e-light has become o-light. The o-light and e-light components then pass through the G-lens 90, and the birefringent device 60 recombines the light components for output to the third fiber 53 (for passage to a fiber coil 36).

Figure 5B:
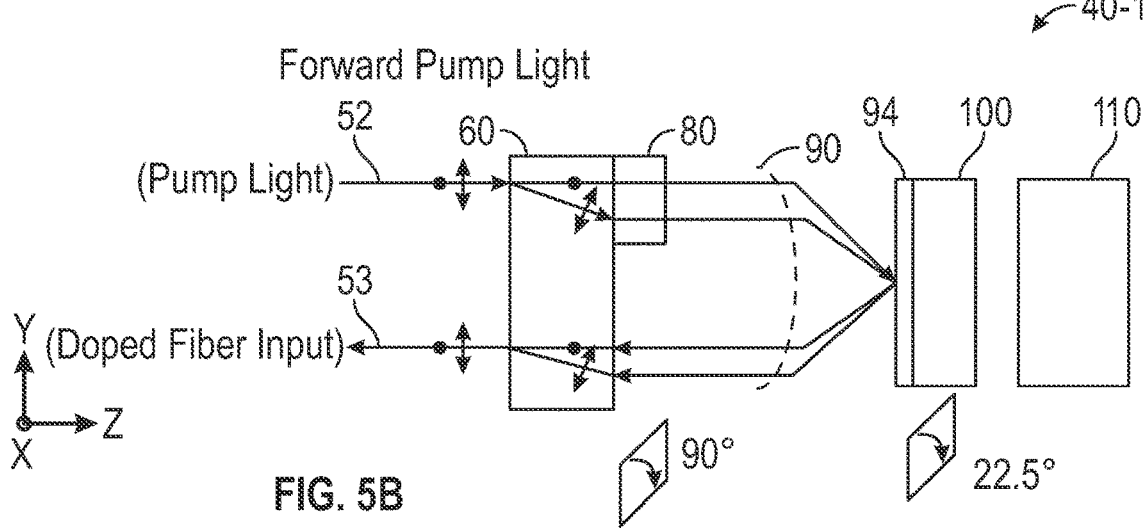

Meanwhile, as shown in FIG. 5B, the pump light is input at the second fiber 52, and the birefringent device 60 splits the pump light into o-light and e-light components. The second (45° λ/2) waveplate 80 rotates the o-light and e-light components of the pump light by 90 degrees so that the o-light turns into e-light and the e-light turns into o-light. The o-light and e-light components of the pump light are reflected by the optical filter 94 on the G-lens 90 and are then recombined when they return to the birefringent device 60 for final output along with the source light to the third fiber 53 (for passage to the fiber coil 36).

Figure 5C:
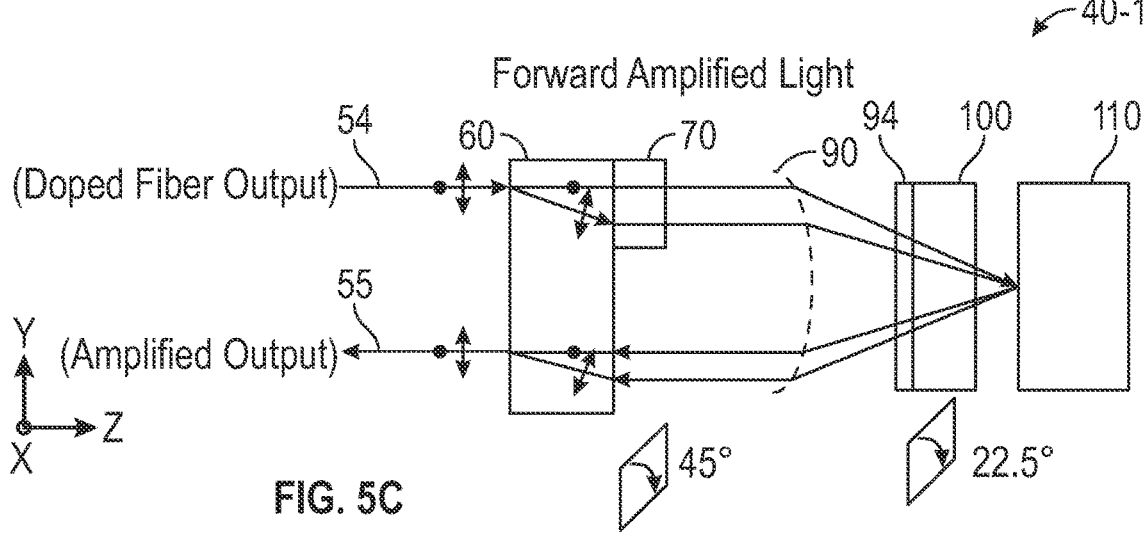

As shown in FIG. 5C, amplified source light output from the doped fiber coil (36) is input at the fourth fiber 54 and is split into o-light and e-light components by the birefringent device 60. The first (67.5° λ/2) waveplate 70 rotates the o-light and e-light components by 45 degrees. After passing through G-lens 90, the Faraday rotator 100 rotates the light components by 22.5 degrees, and the wedge reflector 110 reflects the light components. Again, the Faraday rotator 100 rotates the light components by 22.5 degrees so the o-light turns into e-light and the e-light turns into o-light. The light components then pass through the G-lens 90 and are recombined by the birefringent device 60 for final output at the fifth fiber 55 (as amplified source light).

The above three light paths for the fibers 51 to 53, 52 to 53, and 54 to 55 are independent, and the pass (√) and fail (x) channels are shown below in table 1.1.

TABLE 1

| | Forward Optical Channel List | | |
| | | IN | |
| OUT | Port 51 | Port 52 | Port 54 |
| Port 51 | X | X | X |
| Port 52 | X | X | X |
| Port 53 | ✓ | ✓ | X |
| Port 54 | X | X | X |
| Port 55 | X | X | ✓ |

Figure 6A:
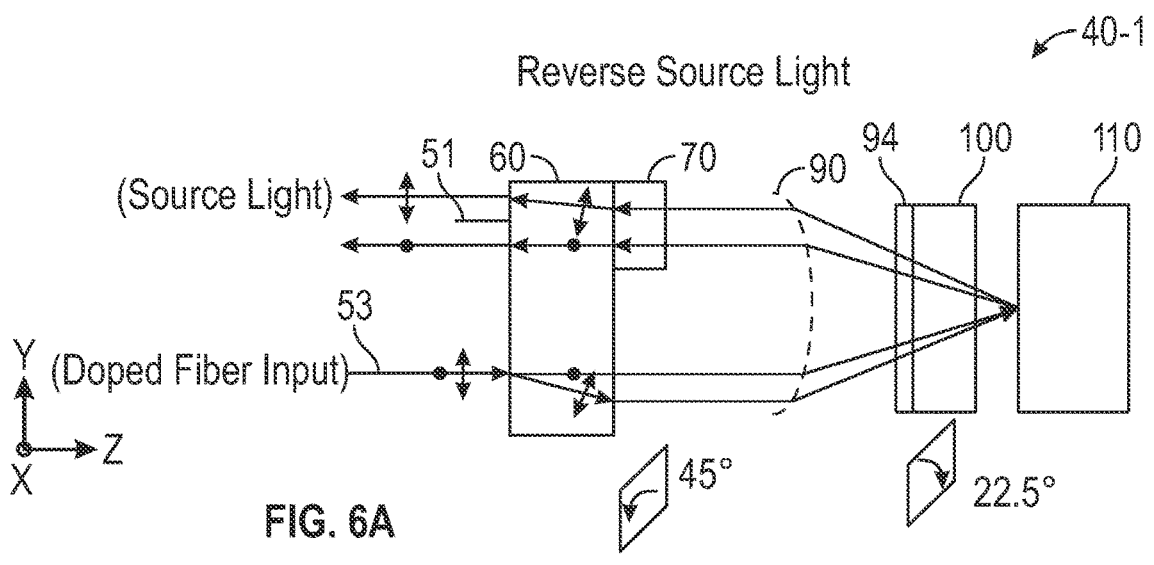
FIGS. 6A, 6B, and 6C diagram a reverse light-path scheme for the first folded hybrid assembly.
Figure 6B:
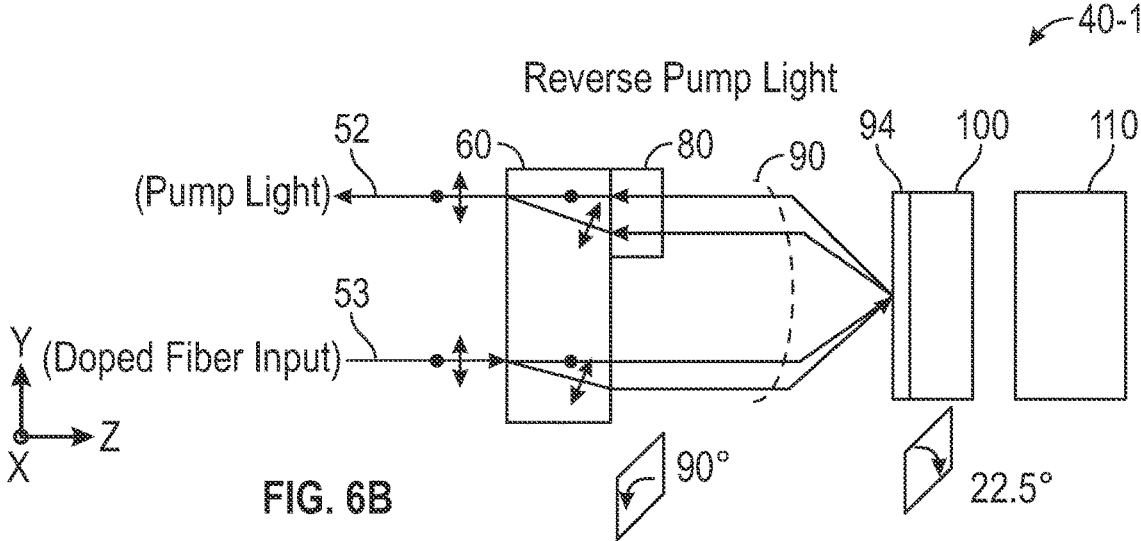
Figure 6C:
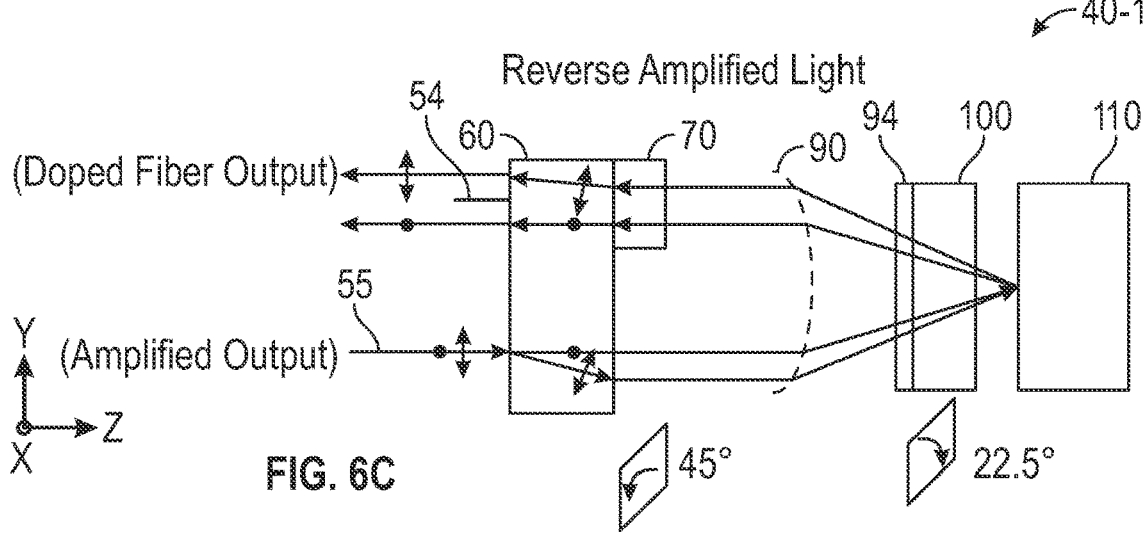

FIGS. 6A, 6B, and 6C diagram the first folded hybrid assembly 40-1 in a reverse light-path scheme and show how the assembly 40-1 can provide isolating functions for reverse, back-reflected light. As shown in FIG. 6A, reverse source light from the output of the doped fiber coil (36) may be input at the third fiber 53. If so, the birefringent device 60 splits the source light into o-light and e-light components. After passing through the G-lens 90, the Faraday rotator 100 rotates the light components by 22.5 degrees, and the wedge reflector 110 reflects the light components. The Faraday rotator 100 again rotates the two light components by 22.5 degrees. After the G-lens 90, the first (67.5° λ/2) waveplate 70 then reverse rotates the light components by 45 degrees. The o-light and e-light components are maintained. The birefringent device 60 does not recombine them, and no light is output to the first fiber 51. This achieves an isolator function.

Meanwhile, as shown in FIG. 6B, reverse pump light from the input of the doped fiber coil (36) may also be input at the third fiber 53. If so, the birefringent device 60 splits the pump light into o-light and e-light components. These two light components are reflected by the coating film 94 on the G-lens 60. The second (45° λ/2 waveplate) rotates the light components by 90 degrees so that the o-light turns into e-light and the e-light turns into o-light. The light components are recombined when they return to the birefringent device 60 and are finally output to the second fiber 52. The pump laser (34) can handle the reverse pump light using known techniques.

As shown in FIG. 6C, reversed amplified output from the assembly 40-1 may be input at the fifth port 55. If so, the reverse light is split into o-light and e-light components by the birefringent device 60. After passing through G-lens 90, the two light components are rotated 22.5 degrees by the Faraday rotator 100 and are then reflected by the wedge reflector 100. Passing again through the Faraday rotator 100, the two light components are rotated 22.5 degrees, and the second (67.5° λ/2 waveplate) after G lens 90 reverse rotates the light components by 45 degrees. Thus, the o-light and e-light components are maintained, and the birefringent device 60 does not recombine them. Therefore, no light is output to the fourth fiber 54. This achieves another isolator function.

The above light paths are independent, and the pass (√) and fail (x) channels are shown in table 1.2.

TABLE 2

Reverse Optical Channel List

| | IN | |
|---|---|---|
| OUT | Port 53 | Port 55 |
| Port 51 | X | X |
| Port 52 | ✓ | X |
| Port 53 | X | X |
| Port 54 | X | X |
| Port 55 | X | X |

Figures 7A, 7B, 7C:
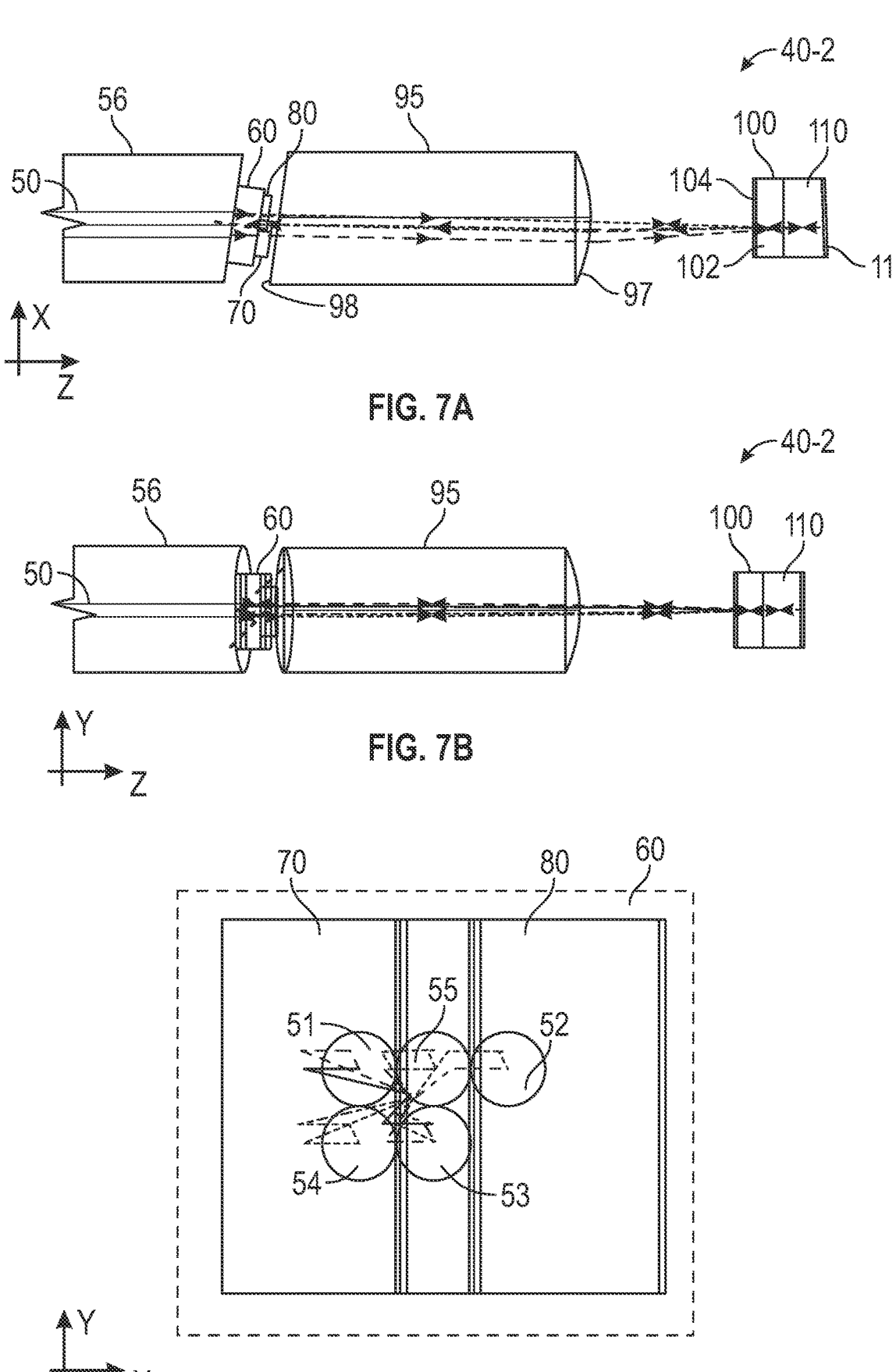
FIGS. 7A, 7B, and 7C illustrate side, top, and end views of a second embodiment of a folded hybrid assembly.

FIGS. 7A, 7B, and 7C illustrate side, top, and end views of a second embodiment of a folded hybrid assembly 40-2. The second folded hybrid assembly 40-2 is similar to the first assembly 40-1 discussed above so that similar elements have comparable reference numbers.

As before, this folded hybrid assembly 40-2 includes a 2-by-3 fiber array 50, a birefringent device 60, waveplates 70 and 80, a lens 95, a Faraday rotator 100, and a wedge reflector 110. In contrast to the first assembly 40-1, this second folded hybrid assembly 40-2 uses a C-lens 95 instead of a G-lens. The C-lens 95 can have two focal planes, e.g., front and back focal planes. As is typical and as shown in FIG. 7A, the C-lens 95 includes an oblique end surface on the back face 98 and includes a convex lens 67 on the front face.

Also, an optical filter 104, such as a coating film, is disposed on the backplane 102 of the Faraday rotator 100, as opposed to being on the lens as before. The optical filter 104 is configured to reflect the pump light wavelength, but is configured to pass the source light wavelength.

The fibers 51 . . . 55 are configured in a 2-by-3 array 50 as before. As shown, the fibers 51 . . . 55 can be arranged in a fiber pigtail or fiber head 56. The interface plane 58 of the fiber head 56 is cut at an 8-degree plane along the directions of the three adjacent fibers 51, 52, 53 of the array 50. The fibers 51 . . . 55 are arranged in five ports of the head 56 having specific positions (a first row of three ports and a second row of two ports, as shown in FIG. 5C).

The birefringent device 60 is affixed (e.g., glued) onto the head's 8-degree interface plane 58 and covers all of the ports having the fibers 51 . . . 55. The angle of the device's optical axis in the Y-Z plane is about 45 degrees.

The first (67.5° λ/2) waveplate 70 is affixed (e.g., glued) on the birefringent device's surface and covers the ports having the first fiber 51 (for input of the source signal) and the fourth fiber 54 (for input of the amplified source signal). The second (45° λ/2) waveplate 80 is also affixed (e.g., glued) on the birefringent device's surface and covers the port having the second fiber 52, which receives the pump light from the pump laser (34). The ports for the third and fifth fibers 53, 55 are not covered by the waveplates 70, 80.

As noted, the backplane 98 of the C-lens 95 is cut at an 8-degree plane to match the head's interface 58. This reduces reflection. The front plane 97 of the C-lens forms a convex lens surface.

The Faraday rotator 100 is positioned a distance from the C-lens 95 and has an optical rotation angle of 22.5 degrees. The optical filter 104 on the rotator's front plane 102 is configured to reflect the wavelength of the pump light and is configured to pass the wavelength of the source light. The wedge reflector 110 is affixed (e.g., glued) on the Faraday rotator 100. The back wedge surface 112 is coated with a reflecting film configured to reflect light incident thereto, such as the source light wavelength.

The assembly 40-2 routes the signal and pump light in a forward light path scheme to produce an amplified output. As shown, the source light is input at the first fiber 51, and the birefringent device 60 splits the source light into ordinary light (o-light component) and extraordinary light (e-light component). The first (67.5° λ/2) waveplate 70 then rotates the o-light and e-light components by 45 degrees. Passing through the C-lens 95, the C-lens 95 focuses the source light to the optical filter 104, which lets the source light pass. The Faraday rotator 100 rotates the o-light and e-light components 22.5 degrees, and the wedge reflector 110 reflects the light back. The o-light and e-light components are again rotated 22.5 degrees by the Faraday rotator 100. Rotated a total of 90 degrees at this point, the o-light has become e-light, and the e-light has become o-light. The o-light and e-light components are focused by the C-lens 90, and the birefringent device 60 recombines the light components for output to the third fiber 53 (for passage to a fiber coil 36).

Meanwhile, the pump light is input at the second fiber 52, and the birefringent device 60 splits the pump light into o-light and e-light components. The second (45° λ/2) waveplate 80 rotates the o-light and e-light components of the pump light by 90 degrees so that the o-light turns into e-light and the e-light turns into o-light. Focused by the C-lens 95, the o-light and e-light components of the pump light are reflected by the optical filter 104 on the Faraday rotator 100 and are then recombined when they return to the birefringent device 60 for final output along with the source light to the third fiber 53 (for passage to the fiber coil 36).

Amplified source light from the doped fiber coil (36) is input at the fourth fiber 54 and is split into o-light and e-light components by the birefringent device 60. The first (67.5° λ/2) waveplate 70 rotates the o-light and e-light components by 45 degrees. After being focused by the C-lens 95, the amplified source light passes through the optical filter 104, and the Faraday rotator 100 rotates the light components by 22.5 degrees. In turn, the wedge reflector 110 reflects the light components, and the Faraday rotator 100 again rotates the light components by 22.5 degrees so the o-light turns into e-light and the e-light turns into o-light. The light components then pass through the C-lens 95 and are combined by the birefringent device 60 for final output at the fifth fiber 55 (as amplified source light).

The second folded hybrid assembly 40-2 in a reverse light-path scheme can provide isolating functions for reverse, back-reflected light. For example, reverse source light from the output of the doped fiber coil (36) may be input at the third fiber 53. If so, the birefringent device 60 splits the source light into o-light and e-light components. After passing from the C-lens 95 and through the optical filter 104, the Faraday rotator 100 rotates the light components by 22.5 degrees, and the wedge reflector 110 reflects the light components. The Faraday rotator 100 again rotates the two light components by 22.5 degrees. After the C-lens 95, the first (67.5° λ/2) then reverse rotates the light components by 45 degrees. The o-light and e-light components are maintained. The birefringent device 60 does not recombine them, and no light is output to the first fiber 51. This achieves an isolator function.

Meanwhile, reverse pump light from the input of the doped fiber coil (36) may be input at the third fiber 53. If so, the birefringent device 60 splits the pump light into o-light and e-light components. Focused by the C-lens 95, these two light components are reflected by the coating film 104 on the Faraday rotator 100 back through the C-lens 95. The second (45° λ/2 waveplate) rotates the light components by 90 degrees so that the o-light turns into e-light and the e-light turns into o-light. The light components are recombined when they return to the birefringent device 60 and are finally output to the second fiber 52. The pump laser (34) may handle reverse pump light using known techniques.

Reverse amplified output from the assembly 40-2 may be input at the fifth port 55. If so, the reverse light is split into o-light and e-light components by the birefringent device 60. After passing through C-lens 95, the two light components are rotated 22.5 degrees by the Faraday rotator 100 and are then reflected by the wedge reflector 100. Passing again through the Faraday rotator 100, the two light components are rotated 22.5 degrees, and the second (67.5° λ/2 waveplate) after C-lens 95 reverse rotates the light components by 45 degrees. Thus, the o-light and e-light components are maintained. Therefore, the birefringent device 60 does not recombine them, and no light is output to the fourth fiber 54. This achieves another isolator function.

Figures 8A, 8B, 8C:
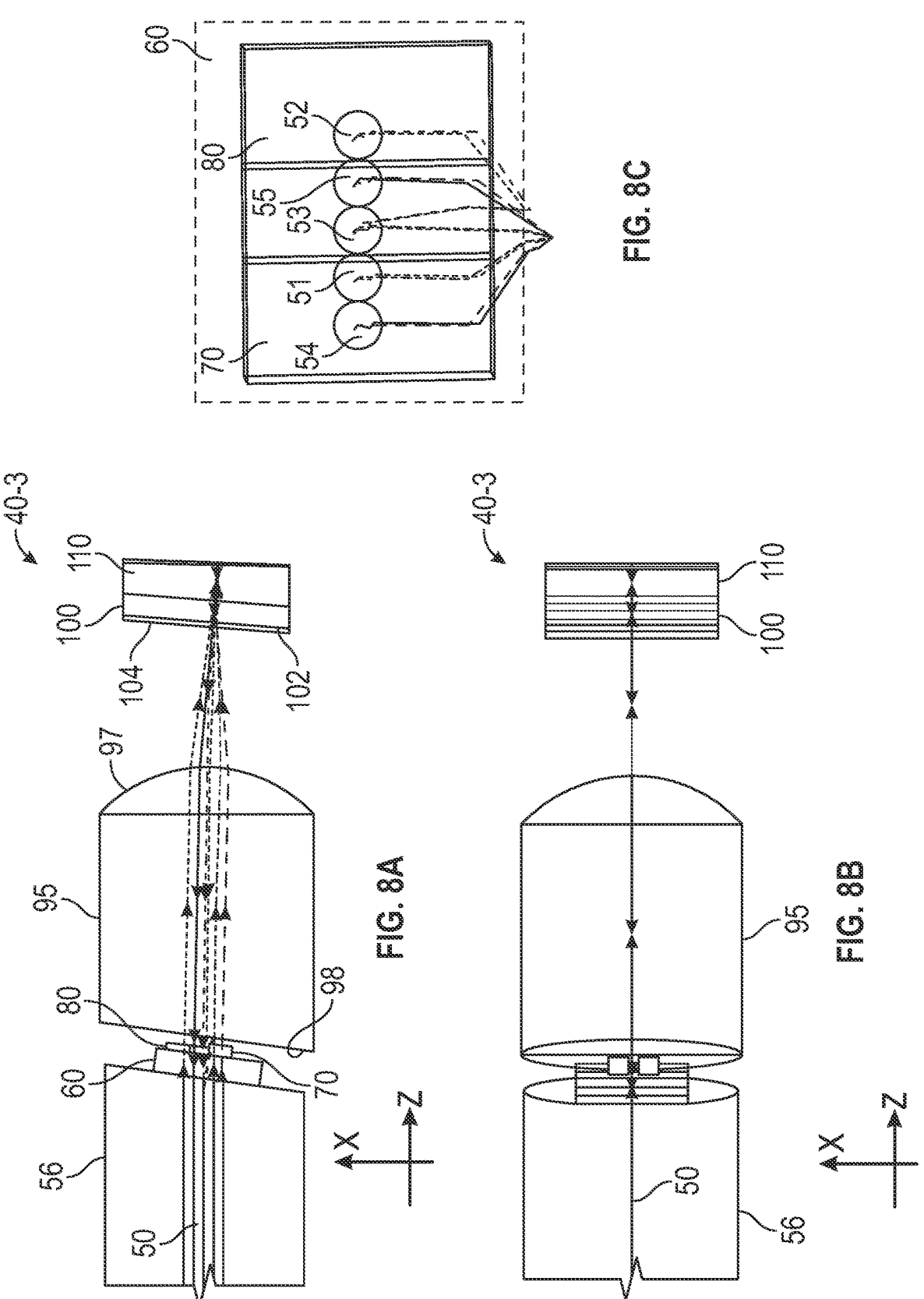
FIGS. 8A, 8B, and 8C illustrate side, top, and end views of a third embodiment of a folded hybrid assembly.

FIGS. 8A, 8B, and 8C illustrate side, top, and end views of a third embodiment folded hybrid assembly 40-3. The third folded hybrid assembly 40-3 is similar to the second assembly 40-2 discussed above so that similar elements have comparable reference numbers. In contrast to the second assembly, this third folded hybrid assembly 40-3 uses a 1-by-5 fiber array 50 instead of a 2-by-3 fiber array. Forward and reverse routing of the light for this assembly 40-3 is similar to the second assembly 40-2 of FIGS. 7A-7C discussed above. Therefore, the discussion provided above is reincorporated here and is not repeated for the sake of brevity.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An assembly for use with an amplifier that amplifies light using source light, pump light, and a doped fiber, the assembly comprising:

a plurality of ports including a first port for input of the source light, a second port for input of the pump light, a third port for output to the doped fiber, a fourth port for input from the doped fiber, and a fifth port for amplified output;

a birefringent device in optical communication with each of the ports and being configured to refract o-light and e-light components of the light passing therethrough with different refractive indices;

a first half-wave plate in optical communication through the birefringent device with the first and fourth ports and configured to rotate polarization of the light passing therethrough with a first rotation;

a second half-wave plate in optical communication through the birefringent device with the second port and configured to rotate polarization of the light passing therethrough with a second rotation different from the first polarization;

a lens in optical communication with each of: the third and fifth ports through the birefringent device, the first and fourth ports through the first half-wave plate, and the second port through the second half-wave plate;

an optical filter in optical communication with the lens, the optical filter being configured to reflect the pump light back to the lens and being configured to pass the source light;

a rotator in optical communication with the lens and being configured to rotate polarization of the light passing therethrough with a third rotation, the third rotation being half of the first rotation, the first rotation being half of the second rotation; and a wedge reflector in optical communication with the rotator and being configured to reflect the light incident thereto.

2. The assembly of claim 1, comprising a fiber array having a fiber for each of the ports, each of the fibers in optical communication with the birefringent device.

3. The assembly of claim 2, wherein the fiber array comprises:

a first row of three of the fibers for the first, fifth, and second ports; and a second row of two of the fibers for the fourth and third ports.

4. The assembly of claim 2, wherein the fiber array comprises a one-by-five array of the fibers.

5. The assembly of claim 2, wherein the fiber array comprises a fiber head having the fibers installed therein, an interface of the fiber head defined at an angle.

6. The assembly of claim 5, wherein the birefringent device is affixed to the interface.

7. The assembly of claim 6, wherein a back face of the lens is defined at the angle comparable to the interface of the fiber head.

8. The assembly of claim 1, wherein the first and second half-wave plates are affixed to a surface of the birefringent device.

9. The assembly of claim 1, wherein the rotator is a Faraday rotator having a magneto-optical crystal surrounded by a magnetic field device.

10. The assembly of claim 1, wherein the third rotation is a rotation angle that is half of the second rotation, whereby the first rotation is three times the rotation angle and the second rotation is two times the rotation angle.

11. The assembly of claim 1, wherein the first half-wave plate comprises a 67.5-degree λ/2 waveplate; and wherein the second half-wave plate comprises a 45-degree λ/2 waveplate.

12. The assembly of claim 1, wherein the lens comprises a gradient refractive index lens; and wherein the optical filter comprises an optical film on a front face of the gradient index lens.

13. The assembly of claim 12, wherein the rotator is affixed to the front face of the gradient refractive index lens having the optical film.

14. The assembly of claim 13, wherein the wedge reflector is affixed to a front face of the rotator.

15. The assembly of claim 1, wherein the lens comprises a C-lens having concave front face; and wherein the rotator is disposed at a distance from the concave front face of the C-lens.

16. The assembly of claim 15, wherein the optical filter comprises an optical film disposed on a back face of the rotator.

17. The assembly of claim 15, wherein the wedge reflector is affixed to a front face of the rotator.

18. An amplifier comprising:
an assembly according to claim 1; and
a doped fiber for amplifying source light using pump light.

19. A method to amplify source light using pump light and a doped fiber for an amplified output, the method comprising:
receiving the source light at a source input and communicating the source light to a fiber input of the doped fiber by:
splitting the source light into o-light and e-light components through a birefringent device;
first rotating the split source light by a first rotation using a first half-wave plate;
first focusing the first rotated source light with a lens;
second rotating the first focused source light by a third rotation using a rotator;
reflecting the second rotated source light using a wedge reflector;
third rotating the reflected source light by the third rotation using the rotator;
second focusing the third rotated source light with the lens; and
combining the o-light and e-light components of the second focused source light through the birefringent device for the fiber input to the doped fiber; and
receiving the pump light at a pump input and combining the pump light with the source light for the fiber input of the doped fiber by:
splitting the pump light into o-light and e-light components through the birefringent device;
first rotating the split pump light by a second rotation using a second half-wave plate;
first focusing the first rotated pump light with the lens;
reflecting the first focused pump light using an optical filter;
second focusing the reflected pump light with the lens; and
combining the o-light and e-light components of the second focused pump light through the birefringent device for the input to the doped fiber.

20. The method of claim 19, further comprising communicating amplified light from a fiber output of the doped fiber to the amplified output by:

splitting the amplified light into o-light and e-light components through the birefringent device;
first rotating the split amplified light by the first rotation using the first half-wave plate;
first focusing the first rotated amplified light with the lens;
second rotating the first focused amplified light by the third rotation using a rotator;
reflecting the second rotated amplified light using the wedge reflector;
third rotating the reflected amplified light by the third rotation using the rotator;
second focusing the third rotated amplified light with the lens; and
combining the o-light and e-light components of the second focused amplified light through the birefringent device for the amplified output.

21. The method of claim 19, further comprising isolating reverse light at the fiber input of the doped fiber from the source input by:
splitting the reverse light into o-light and e-light components through the birefringent device;
first focusing the split reverse light with the lens;
first rotating the first focused reverse light by the third rotation using the rotator;
reflecting the first rotated reverse light using the wedge reflector;
second rotating the reflected reverse light by the third rotation using the rotator;
second focusing the second rotated reverse light with the lens;
reverse rotating the second focused reverse light by the first rotation using the first half-wave plate;
further splitting the o-light and e-light components of the reverse rotated reverse light through the birefringent device away from the source input.

22. The method of claim 19, further comprising isolating reverse light at the amplified output from the fiber output of the doped fiber by:
splitting the reverse light into o-light and e-light components through the birefringent device;
first focusing the split reverse light with the lens;
first rotating the first focused reverse light by the third rotation using the rotator;
reflecting the first rotated reverse light using the wedge reflector;
second rotating the reflected reverse light by the third rotation using the rotator;
second focusing the second rotated reverse light with the lens;
reverse rotating the second focused reverse light by the first rotation using the first half-wave plate; and
further splitting the o-light and e-light components of the reverse rotated reverse light through the birefringent device away from the fiber input.

* * * * *